July 25, 1933.  W. H. BESIGK  1,919,611
APPARATUS FOR AUTOMATICALLY REGULATING THE
DRILL PRESSURE IN DEEP BORING PLANTS
Filed Aug. 13, 1931  4 Sheets-Sheet 1

Inventor:
Wilhelm Hermann Besigk
By ...
Atty.

Inventor:
Wilhelm Hermann Besigk
By
Atty.

July 25, 1933.  W. H. BESIGK  1,919,611
APPARATUS FOR AUTOMATICALLY REGULATING THE
DRILL PRESSURE IN DEEP BORING PLANTS
Filed Aug. 13, 1931  4 Sheets-Sheet 3
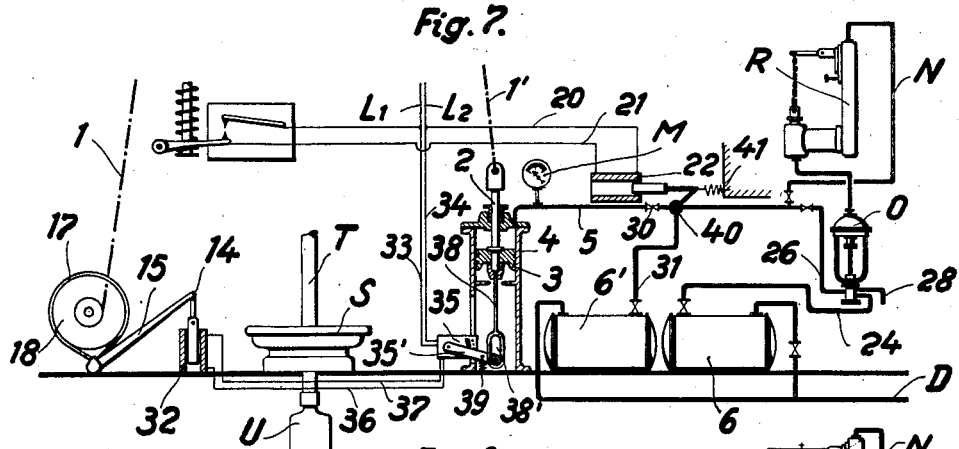
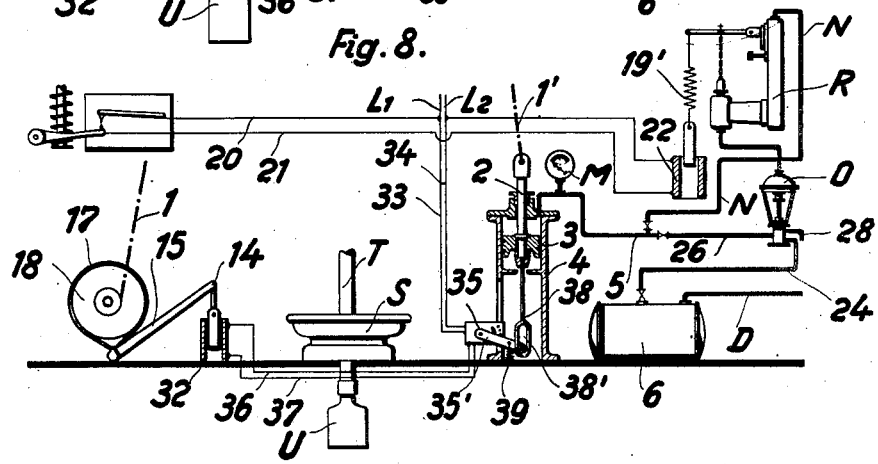
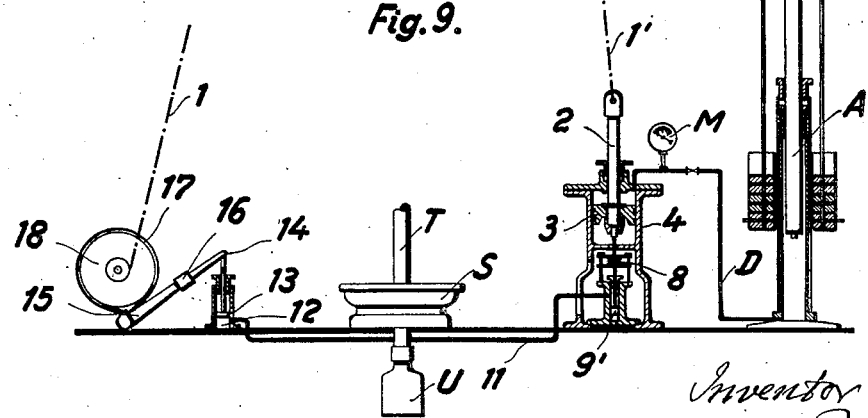
Inventor:
Wilhelm Hermann Besigk,
By
Atty

Patented July 25, 1933

1,919,611

UNITED STATES PATENT OFFICE

WILHELM HERMANN BESIGK, OF DUSSELDORF-AUF DER HARDT, GERMANY, ASSIGNOR TO FIRM: HANIEL & LUEG G. M. B. H., OF DUSSELDORF-GRAFENBERG, GERMANY

APPARATUS FOR AUTOMATICALLY REGULATING THE DRILL PRESSURE IN DEEP-BORING PLANTS

Application filed August 13, 1931, Serial No. 556,809, and in Germany August 15, 1930.

This invention comprises a new and improved apparatus for automatically regulating the drill pressure and the drill feed characterized by the feature that the drill pressure and the torque automatically will be kept within predetermined limits.

The apparatus according to the invention enables to regulate for periods of some length, for instance as long as the length and in connection therewith the weight of the drilling rods remain constant, the drill pressure and the torque in such a way that the drill pressure does not fall below a value adjustable by hand and that in the same manner the torque does not exceed a predeterminable maximum.

For this purpose the free end of the rope supporting the drilling tool is loaded, in opposition to the load due to the drilling tool, by a suitably variable weight or pressure device acting upon a piston fastened to the rope end, or it is subjected to an electromagnetic action, the free rope end being connected with the movable iron core of a solenoid. Moreover by mechanical, electric, hydraulic or pneumatic means the draw rope end is indirectly or directly connected with the brake rods at the draw rope drum to the effect that the brake is released or tightened by the movements of the draw rope according to the variations of the drill pressure. On the other hand the prime mover or the parts transmitting the driving power are fitted with devices which, depending upon the resistance of the rock against the bit, cause the load at the draw rope end to be indirectly or directly variated.

When for instance the strain acting upon the drilling rods, when drilling through hard rock, or when the bit feed is excessive, is increased and thereby the increased torque exceeds the predetermined and adjusted maximum, the pull at the drill rope end is increased or the piston attached to the draw rope end is acted upon by a higher pressure lifting thereby the drilling tool by a corresponding amount, or the current flowing through the coils of the solenoid is intensified, the iron core thereby being drawn in with a greater force. When however the drill pressure and in connection therewith eventually the torque becomes smaller than it has been adjusted, the free draw rope end is released of its load again and by releasing the rope drum brakes the draw rope is slipped out until the drill pressure necessary for continuing the drilling operation has been attained.

For a certain length of the drilling rods and therefore for a certain weight of the drilling rods as a rule it will be possible to maintain the drill pressure constant, i. e. the reaction pressure of the drilling bit upon the bottom of the boring hole, a readjustment by hand of the load acting upon the draw rope end being necessary only when adding a new drilling rod section. The amount of the torque too, if any, requires to be modified only when the drilling rods are lengthened or when the bit is advanced into rocks with varying hardness. The maximum and minimum limits once having been adjusted by hand will be kept to entirely automatically according to the invention, the bit always working upon the bottom of the boring hole with a constant drill pressure and being moved up and down intermittently, when meeting with resistance, until the rocks causing the resistance have been drilled through.

The accompanying drawings by way of example show devices which represent different designs embodying the invention.

Figs. 7 and 8 illustrate examples of draw rope ends subjected to the action of a fluid under pressure and loaded by piston with electric impulse transmission and electric operation of the brake of the draw rope drum.

Fig. 9 represents a drill pressure regulating plant for shallow and medium boring depths operating with a pressure accumulator.

Figure 10:
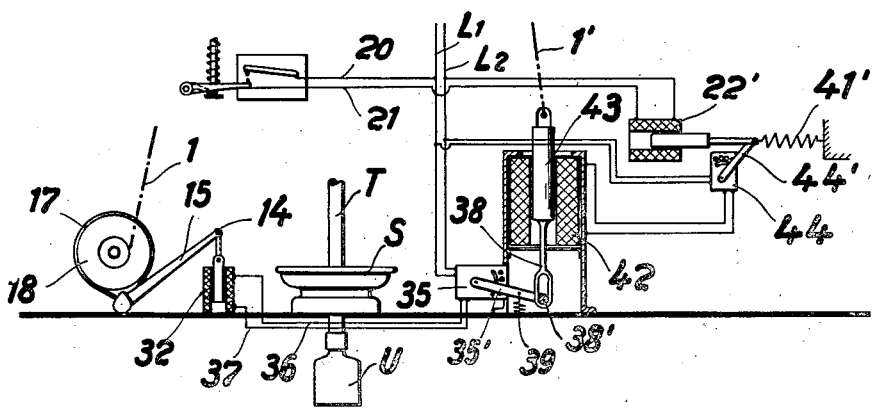
Figs. 10 and 11 show completely electrically regulating plants.

The free end 1' of the draw rope 1 represented in the drawings by a dot and dash line is connected in each one of the cases shown in Figs. 1, 3, 7-9 by means of the piston rod 2 with the piston 3 of the pressure regulating cylinder 4, whereas in Fig. 10 it is connected with the iron core 43 of a solenoid 42. Through the pressure fluid piping 5 the pressure cylinder 4 is kept under the influence of the pressure fluid contained in the receiver 6 and adjustable to variable and at least two different pressure stages so that, according to the adjustment of the regulating device known in itself, a constant normal pressure and a correspondingly higher pressure able to lift the load of the boring tool can be caused to act upon the piston 3. The piston rod 2 is provided with a channel 2' in which a downwardly extended rod 7 is guided by a flange 7' so that, when the piston is rising, it will be taken along by the stop collar 2'' from a definite position, whereas otherwise without movement it slides in the guide when below this position of the piston. A spring 8 draws the rod 7 always downwards, as soon as the piston goes down. At its other end the rod 7 terminates in a valve cone 9 which, when lifted, admits the pressure fluid from the pressure receiver 6 through the pipes 10 and 11 into the cylinder 12. In the interior of this cylinder a piston 13 is connected through the link 14 with the brake lever 15 the additional weight 16 of which tightens the brake strap 17. The pressure fluid, when acting upon the piston 13, releases the brake strap. This brake strap 17 can be substituted by any braking device whatsoever of a design well-known in itself and connected to the draw rope drum 18 in any well-known manner.

Figure 2:
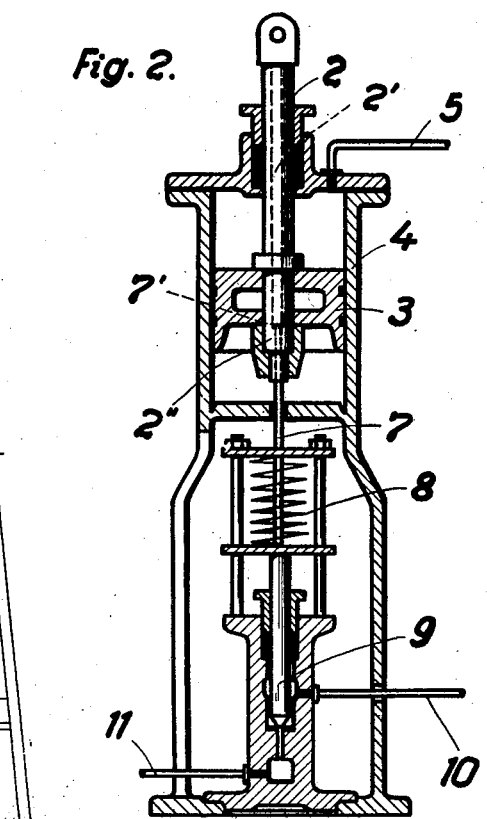
Fig. 2 shows, partially diagrammatically, a longitudinal section of the pressure cylinder and the load piston.
Figure 1:
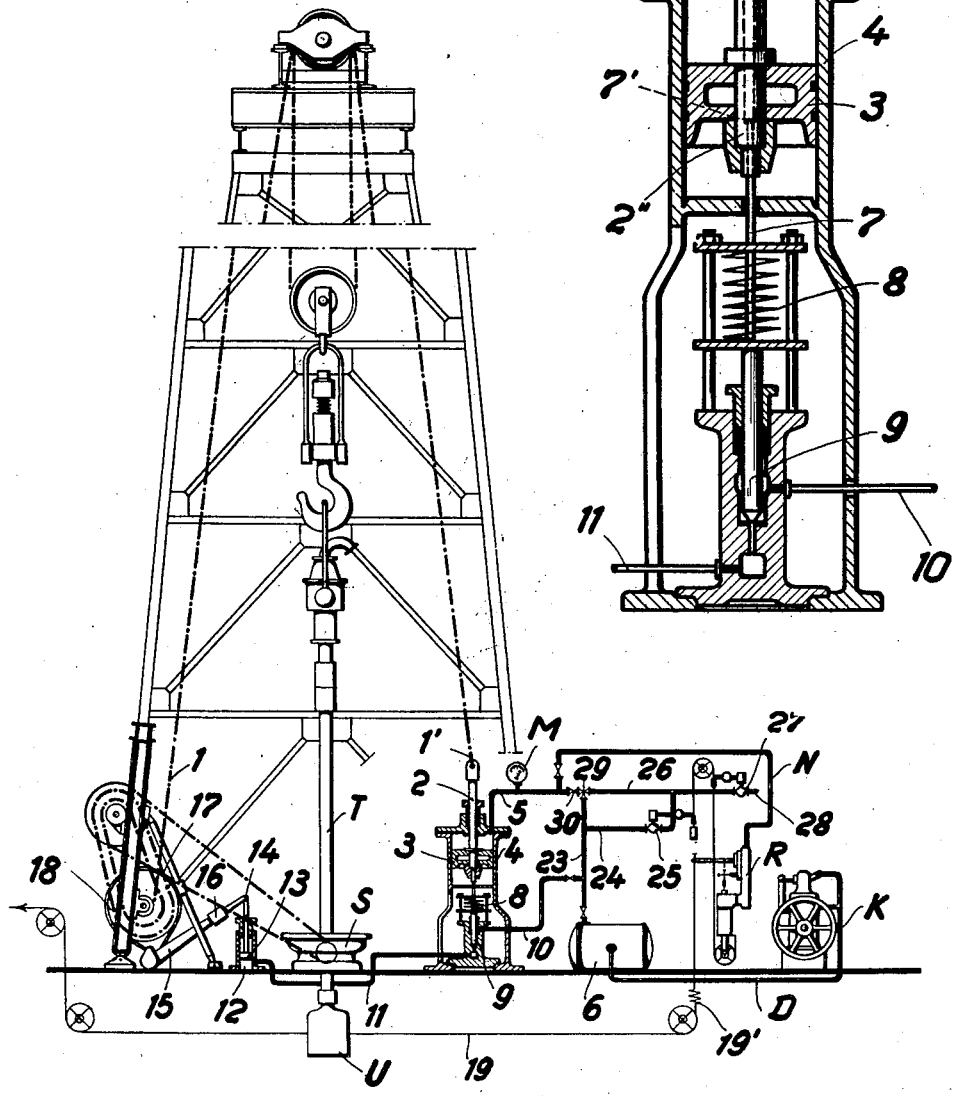
Fig. 1 shows a completely hydraulically or pneumatically operated regulating plant in combination with the boring plant in the derrick.
Figure 3:
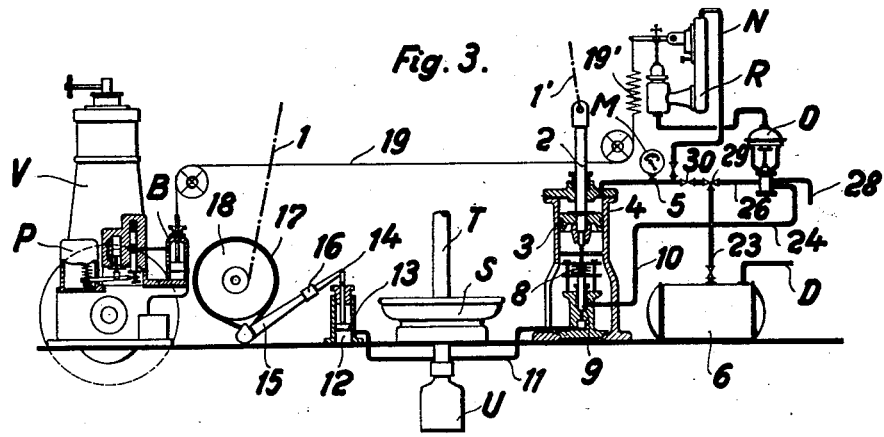
Fig. 3 represents a plant operated by means of a fluid under pressure and arranged in combination with a boring plant driven by an internal combustion engine.
Figure 4:
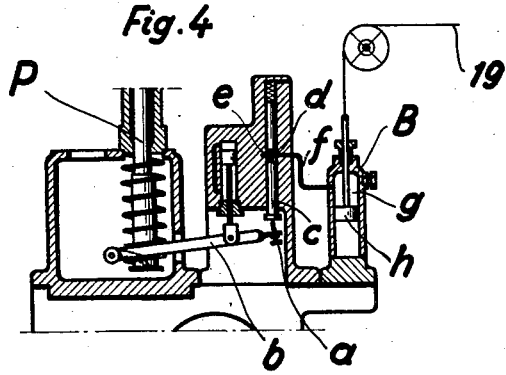
Fig. 4 represents the impulse transmitter as arranged at the fuel pump of the internal combustion engine.
Figure 5:
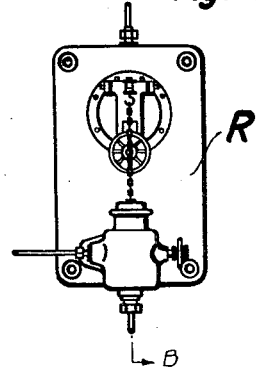
Fig. 5 is a plan view of the diaphragm regulator.
Figure 6:
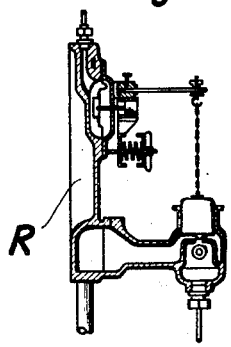
Fig. 6 is a section through this regulator on the line A—B of Fig. 5.

The prime mover not shown in the Figs. 1, 7 and 8 or any other power transmission parts suitable for regulating the drill pressure from which the impulse for the control may be derived, or the internal combustion engine V as outlined by way of example in Fig. 3 having the fuel pump P and the pressure cylinder B communicate through the rod or rope connection 19 with the relay R (Figs. 1 and 3) or through the conductors 20 and 21 communicating through the current network with the conductors $L_1$ and $L_2$ with the solenoid 22 (Figs. 7 and 8) whereby they again are communicating indirectly (Fig. 7) or directly (Fig. 8) with the relay R. Thereby the impulse to be derived from the prime mover or the power transmission parts for regulating the higher pressure acting upon the piston 3 of the pressure cylinder 4 and required for lifting the load represented by the drilling tool is brought into action, when the torque is exceeded. The spring 19' provided in the rod or rope connection 19 of Figs. 1 and 3 serves to compensate any oscillations.

In Fig. 1 K indicates diagrammatically a compressor or a pressure pump which supplies the pressure fluid having the maximum pressure required in all cases through the pipe line D into the receiver 6. Intermediate between the pressure vessel 6 and the pressure cylinder 4 and in continuation of pipe line 23 there is fitted into the branch pipe line 24 a pressure regulating valve 25 which permits to reduce the pressure fluid supplied by the pressure receiver to a predetermined pressure or to maintain respectively a normal pressure as adjusted at the relay. In the connecting pipe line 26 moreover a regulating valve 27 is fitted in followed by the pressure release pipe line 28. 29 represents a three-way cock by means of which the regulating device may be cut out by hand and through which, when valve 30 is open, the pressure fluid may be directly led from the pipe line 23 through the pipe line 5 to the pressure cylinder 4. Pipe line N enables to transmit to the relay R the pressure as existing actually at the pressure cylinder 4 the height of which pressure may be read at the pressure gauge M.

Instead of pressure regulating valves (25 and 27) in Figs. 3, 7 and 8 a pressure regulating valve O acting under a pressure fluid load is provided. The pipe line D represents the connection of the pressure vessel 6 with the pump supplying the pressure fluid. This pump, however, may also be substituted, as shown in Fig. 9, by a pressure accumulator A. But it will be convenient to have this pressure accumulator A also preceded by a pump which permits to keep the accumulator permanently charged. The parts which in Figs. 3, 7-9 are similar as to action and arrangement, have the same reference figures and letters so that the explanations given for Fig. 1 also can be read with reference to the other figures.

Figure 11:
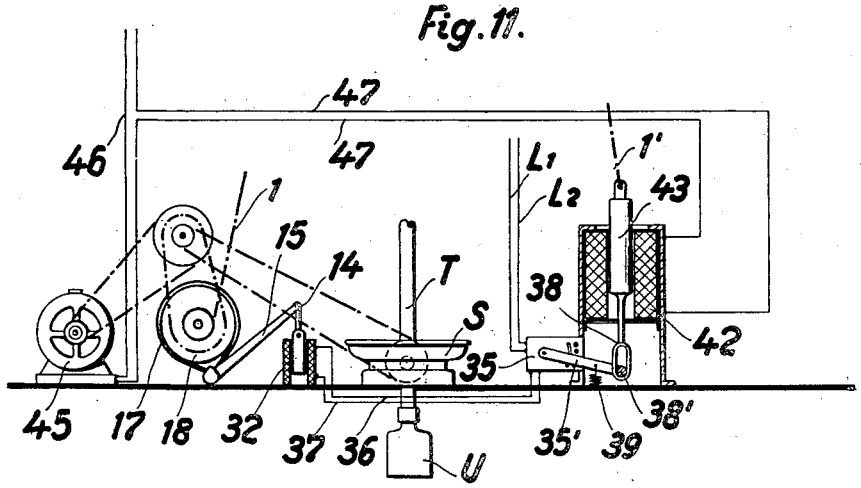

Fig. 7 shows two pressure vessels 6 and 6' one of which, i. e. vessel 6', can be directly brought to act with a definite maximum pressure supplied by the pump upon the piston in the pressure cylinder 4 through the pipe line 31, whereas the other pressure vessel is communicating through the pressure regulating valve, as described heretofore, with the pressure cylinder 4. The brake strap of Figs. 7 and 8 is tightened by a solenoid 32. The electric current taken from the conductors $L_1$ and $L_2$ connected with the current network is supplied to the solenoid 32 through the connecting conductors 33 and 34, through the regulating series resistance 35 and through the conductors 36 and 37. The extension 38 of the piston rod 2 of the piston 3 in this case is provided with a catch slot 38' which holds the crank 35' of the series resistance. After each regulating movement a spring 39 draws the crank 35' back into its initial position corresponding to the maximum passage of current. In the installation of Fig. 10 the rope end 1' being connected with the iron core 43 is subjected to the electromagnetic load due to the solenoid 42. When the normal torque is exceeded, the regulating lever 44' subjected to the influence of the solenoid 22' acting contrary to the tension of the spring 41' admits a greater current strength to the regulating resistance 44 causing the iron core 43 and thereby the rope end 1' to be drawn in or to be tightened respectively. In Fig. 11 the coils of the solenoid 42 are directly arranged into the circuit of the conductors 46, 47 of the electric prime mover, this arrangement enabling also the coils of the solenoid 42 to be supplied with a current of greater intensity, when the torque increases i. e. when more current is consumed. S represents the rotary table, T the drilling rods and U the drilling bit.

The apparatuses will operate as described hereafter.

1. When the bit meets with increasing resistance and the torque exceeds a predetermined adjustable amount, the impulse is transmitted by the rod or rope connection 19 (Figs. 1 and 3) or by the electric conductors 20 and 21 (Figs. 7 and 8) to the hand-adjusted relay R causing this appliance to increase the passage through the pressure regulating valves 25 or O and to bring into action upon the piston 3 of the cylinder 4 a pressure which is higher than the normal pressure. Thereby the piston 3 exercises a stronger pull upon the draw rope 1 lifting thus the drilling rods and diminishing the drill pressure with which the bit U is working upon the bottom of the boring hole. As soon as the drill pressure at the drilling rods and thereby the torque return to their normal values the pressure in excess at the piston is released through the pipe line 28 so as to attain again its adjusted normal value by opening the valve 27 or by a corresponding displacement of the valve O. In Fig. 3 for instance the embodiment of the invention is shown in combination with a Diesel engine. The desired torque is adjusted by means of the screw $a$ connected to the lever $b$ which is actuated by means of the piston or its piston rod or by any part connected therewith. As soon as the fuel pump, owing to a higher load of the motor, injects a greater quantity of fuel, the screw $a$ comes into contact with a distributing slide valve $c$ raising it until the recess $d$ in the distributing slide valve $c$ moves past the air channel $e$ and provides a communication with the cylinder $g$ through the connecting pipe $f$. Thereby pressure is admitted to the piston $h$ causing it to actuate by means of the rod or rope line 19 the regulating device of the relay R. Thereby the adjustment for maintaining a desired constant pressure is suspended as long as the motor is producing an increased torque. During this period the relay R causes a higher pressure to be admitted by means of the valve O into the pressure cylinder 4 which pressure has to be so high as to raise the drilling tool from the bottom of the boring hole.

In the electric regulating device in accordance with Fig. 10 in a similar way a higher current is put into action in the solenoid 22' which by means of the regulating resistance 44 increases the current supplied to the supporting solenoid 42 lifting thereby the drilling tool. In the plant driven by the electric motor 45 and having the installation represented by Fig. 11 the solenoid 42 is put in shunt or in series in one of the current feed mains of the electric motor being supplied thereby directly with a higher current in case a higher torque is presenting itself.

2. When the drill pressure of the drilling bit U becomes less than the amount of pressure fixed for the draw rope end in accordance with the amount of weight or with the pressure at the piston, the drilling rods with their accordingly higher weight stretch the draw rope end pulling upwards therewith the piston 3 in the pressure cylinder 4. In this case the extension 7 of the piston 3 can move without obstruction within the bore 2' of the piston 2 for a certain distance. As soon as the piston 3 is pulled upwards past a predetermined upper point, the stop collar 2" catches the flange 7' of the rod 7 and therewith the valve spindle 9 drawing them upwards against the action of the spring 8. Thereby the fluid pressure of the pressure vessel 6 coming through pipe line 10 which fluid now is acting through pipe line 11 in the cylinder 12 upon the piston 13 connected with the brake lever 15, is caused to act against the brake weight. Owing to the weight of the drilling tool the rope drum 18 slips in the brake strap 17 until the returning piston 3 and therewith the valve spindle 9 is pulled again downwards by the spring 8 and the pipe line 10 is shut for the pipe line 11 and the cylinder 12, enabling thereby the brake weight 16 to tighten the brake strap again.

With reference to Fig. 9 the small piston 9' produces, when the piston 3 moves upwards, a higher pressure which is able to raise the piston 13 against the brake weight 16 mounted to the lever 15 and to release thereby the brake. It is also possible to influence the free rope end by means of a weighted lever instead of by means of a piston 3 under load.

In Figs. 7 and 8 moreover a device is shown which permits to tighten the brake by means of a solenoid 22, the circuit 35, 36, 32, 37 being interrupted for releasing the brake by cutting out step by step the series resistance 35 by means of the lever 35'. The extension 38 of the piston 3 provided with a catch slot 38' now operates the switch lever 35' of the regulating resistance 35, when the drill pressure falls below the adjusted minimum and cuts out the current for the electromagnet 32 step by step causing the brake lever 15 of the draw rope drum 18 to be released and the draw rope drum to be turned by the weight of the boring tool. As soon as by the descent of the boring tool the drill pressure increases, the pull of the spring 39, due to the piston 3 going downwards, cuts in the current step by step at the regulating resistance 35 causing the electromagnet to tighten again the brake strap and to prevent the rope from further unrolling from the drum.

The regulating devices shown in Figs. 10 and 11 work in a similar way.

It is evident from the examples that the method for regulating the drill pressure according to the invention permits a very great variety of modifications. For instance in the case of the boring tool being driven by a Diesel engine or a steam engine as represented in Fig. 7 the regulating device can be operated by a three-way cock by means of the solenoid 22 and the spring 41, the current for actuating the solenoid 22 not being taken, as shown, from an electric network, but being supplied by a small-sized dynamo which is driven by the prime mover and which as soon as the load of the prime mover exceeds the adjusted maximum, actuates by means of a control device a relay which causes the dynamo to be excited so as to supply current and to excite the solenoid 22 the iron core of which turns the plug of the three-way cock by means of the lever against the action of the spring 41. The electromagnet may also be substituted by other suitable devices such as a cylinder in which a pressure fluid controlled by the governor of the driving engine moves a piston. Furthermore it is possible to load the end of the draw rope 1 by weights or other means.

The automatic slipper out device according to the invention not only controls the drill pressure, but now also depends upon the torque of the driving engine. Therefore the feed of the bit can be exactly adjusted to all rocks of any nature whatsoever and to any type of bit (fish tail bits, rock bits, disk bits etc.).

Contrary thereto regulating devices which only depend upon the torque, for instance when drilling with roller type bits, include the risk of the roller pins of these bits being overloaded because the resistance encountered by these bits compared with that when boring with fish tail bits is small. Also slipper out devices which depend upon the drill pressure only, regulate in an unsatisfactory way because the bit when descending can be jammed or slide into a rock fissure, causing the prime mover to be left without any influence, to develop its maximum torque and to twist the drilling rods until they break.

Moreover it is possible to use the cylinder 4 when actuated by compressed air or steam for reducing the acceleration pressures when hoisting the drilling rods or the casing pipes, this cylinder acting as an elastic means and prolonging the time used until the speed is attained, thus reducing therefore the acceleration. This is particularly useful when using claw couplings which are forced to suddenly pull up the load, but also when using friction clutch couplings which will have a longer life and be less under strains, owing to the fact that they are less liable to slide when thrown in. For this reason internal combustion engines of a smaller size can be provided for the drive, which applies as well to three-phase electric motors in case of electric drive, because there is no longer any need to produce a great starting torque. For the same reason the hoisting apparatuses and all the intermediate parts can have much smaller proportions because the strains under which they are working, are much smaller.

I do not wish however to limit my invention consisting in the feed and withdrawal of the bit as described heretofore being regulated for one part by the torque and for the other part by the drill pressure, to the examples shown herein and to the explanations given thereto, as without departing from the spirit and scope of my invention various changes for the said regulating method and device can be found which according to the local conditions may be more convenient.

What I claim is this:

1. In combination with a drilling apparatus comprising a rotary drill, power means for rotating the drill, and suspension means for the drill including a brake for controlling lowering of the drill and means for lifting the drill; said drill suspension means comprising a single device operable in response to the effective weight of the drill to release said brake when the effective weight of the drill exceeds a predetermined maximum and to lift the drill when the effective weight of the drill falls below a predetermined maximum thus to maintain the pressure of the drill against the work substantially constant, said single device also being operable in response to resistance to rotation of the drill to release said brake when the resistance to rotation of the drill falls below a predetermined maximum and to lift the drill when resistance to rotation of the drill exceeds a predetermined maximum thus to maintain the drill torque substantially constant.

2. The combination as set forth in claim 1 including manually adjustable means for variably predetermining the limits of the drill pressure against the work and the limits of the drill torque.

3. In combination with a drilling apparatus including a drill, suspension means for the drill including a normally restrained device for lowering the drill and a separate device operable in response to the effective weight of the drill exceeding a predetermined maximum to lower the drill, and a connection between said devices whereby operation of the second mentioned device to lower the drill effects release of said first mentioned device.

4. In combination with a drilling apparatus including a drill, suspension means for the drill including a device for lowering the drill, a normally applied brake holding said device against drill lowering operation, and a separate device operable in response to the effective weight of the drill exceeding a predetermined maximum to lower the drill and also operable in response to the effective weight of the drill falling below a predetermined minimum to raise the drill, and a connection between said devices whereby operation of the second mentioned device to lower the drill releases said brake and whereby operation of the second mentioned device to raise the drill results in application of said brake.

5. In combination with a drilling apparatus including a drill suspension line and a drill suspended from said line intermediate the ends thereof, a normally restrained device connected to one end of the line for paying out the same to lower the drill, a separate device connected to the other end of the line and operable in response to the effective weight of the drill exceeding a predetermined maximum to pay out the related end of the line to lower the drill and also operable in response to the effective weight of the drill falling below a predetermined minimum to take in the related end of the line to raise the drill, and a connection between said devices whereby operation of the second mentioned device to lower the drill releases the first mentioned device and whereby operation of the second mentioned device to raise the drill results in restoring a restrained status of said first mentioned device.

6. In combination with a drilling apparatus including a rotary drill, power means for rotating the same, and suspension means for the drill including a normally restrained device for lowering the drill and a separate device operable in response to the effective weight of the drill exceeding a predetermined maximum to lower the drill and also operable in response to the effective weight of the drill falling below a predetermined minimum to raise the drill, means whereby said second mentioned device also is operable in response to resistance to rotation of the drill exceeding a predetermined amount to raise the drill and in response to resistance to rotation of the drill falling below a predetermined amount to lower the drill, and a connection between said devices whereby operation of the second mentioned device to lower the drill releases the first mentioned device and whereby operation of the second mentioned device to raise the drill results in restoring a restrained status of said first mentioned device.

7. In combination with a drilling apparatus including a rotary drill, power means for rotating the same, and suspension means for the drill including a normally restrained device for lowering the drill and a separate device for both raising and lowering the drill, means whereby said second mentioned device is operable in response to resistance to rotation of the drill exceeding a predetermined amount to raise the drill and in response to resistance to rotation of the drill falling below a predetermined amount to lower the drill, and a connection between said devices whereby operation of the second mentioned device to lower the drill releases said first mentioned device and whereby operation of the second mentioned device to raise the drill results in restoring a restrained status of said first mentioned device.

8. In combination with a drilling apparatus including a rotary drill, power means for rotating the same, and suspension means for the drill including a normally restrained device for lowering the drill and a separate device operable in response to resistance to rotation of the drill falling below a predetermined amount to lower the drill, and a connection between said devices whereby operation of the second mentioned device to lower the drill effects release of said first mentioned device.

WILHELM HERMANN BESIGK.